United States Patent
Duggal et al.

(10) Patent No.: US 12,437,453 B2
(45) Date of Patent: Oct. 7, 2025

(54) METHODS AND SYSTEMS FOR DYNAMICALLY CREATING SCALABLE VECTOR GRAPHICS (SVG) IN VIDEO CONFERENCING

(71) Applicant: JIO PLATFORMS LIMITED, Ahmedabad (IN)

(72) Inventors: Gaurav Duggal, Hyderabad (IN); Mythili Seshabhattaru, Nizampet (IN); Mayuresh Joshi, Bangalore (IN); Abhilash Bahinipati, Secunderabad (IN); Manoj Kumar Garg, Morena (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/028,550

(22) PCT Filed: Aug. 31, 2022

(86) PCT No.: PCT/IB2022/058161
§ 371 (c)(1),
(2) Date: Mar. 26, 2023

(87) PCT Pub. No.: WO2023/031815
PCT Pub. Date: Mar. 9, 2023

(65) Prior Publication Data
US 2023/0360289 A1   Nov. 9, 2023

(30) Foreign Application Priority Data
Aug. 31, 2021   (IN) .............................. 202121039489

(51) Int. Cl.
*G06T 11/00* (2006.01)
*G06T 11/20* (2006.01)
*H04L 65/1069* (2022.01)

(52) U.S. Cl.
CPC .......... *G06T 11/203* (2013.01); *G06T 11/001* (2013.01); *H04L 65/1069* (2013.01)

(58) Field of Classification Search
CPC ... G06F 2203/0383; G06F 2203/04803; G06F 2203/04808; G06F 3/04886;
(Continued)

(56) References Cited

U.S. PATENT DOCUMENTS

2017/0199750 A1*   7/2017   Reuschel ................ G06F 9/452

FOREIGN PATENT DOCUMENTS

CN          103929351 A       7/2014

OTHER PUBLICATIONS

Jamie Juviler et al., "SVG Files: What They Are and How to Make One", Oct. 2, 2023, https://blog.hubspot.com/website/whatis-an-svg-file, Total pp. 15.
(Continued)

*Primary Examiner* — Hau H Nguyen
(74) *Attorney, Agent, or Firm* — Raj S. Dave; Dave Law Group LLC

(57) ABSTRACT

Present disclosure generally relates to remote visualization using graphics, particularly relates to methods and systems for dynamically creating Scalable Vector Graphics (SVG) in video conferencing. The system creates SVG dynamically based on user's input in whiteboard application in video conferencing solution and then pass the SVG information to other client devices using websocket technology which can then create similar SVG in client devices. The user can collaborate in video meeting. This helps in simulating the exact use case of whiteboard in conference room. The system allows to draw and share ideas in video meeting to other participants.

14 Claims, 11 Drawing Sheets

(58) Field of Classification Search
CPC .. G06F 3/04883; G06F 3/0481; G06F 3/1454; G06F 3/04842; G06F 3/04847; G06F 9/451; G06F 9/452; G06F 16/176; G06T 11/203; G06T 11/206

See application file for complete search history.

(56) References Cited

OTHER PUBLICATIONS

International Search Report, PCT/IB2022/058161, mailed Dec. 15, 2022, Total pp. 02.

\* cited by examiner

METHODS AND SYSTEMS FOR DYNAMICALLY CREATING SCALABLE VECTOR GRAPHICS (SVG) IN VIDEO CONFERENCING

CROSS-REFERENCE TO RELATED APPLICATION(S)

This application is a National Stage of International Application A No. PCT/IB2022/058161, filed on Aug. 31, 2022, which claims priority to Indian Patent Application number 202121039489, filed Aug. 31, 2021, the disclosures of which are hereby incorporated by reference in their entirety.

FIELD OF INVENTION

The embodiments of the present disclosure generally relate to remote visualization using graphics. More particularly, the present disclosure relates to methods and systems for dynamically creating Scalable Vector Graphics (SVG) in video conferencing.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, during video virtual meetings, users may require to simulate real world scenarios such as using whiteboard to present ideas. It may be similar to use whiteboard in conference rooms to explain ideas to other people in room. A Scalable Vector Graphics (SVG) standard may define a way to describe two-dimensional graphics within the extensible markup language (XML) that can be interpreted by multiple programs. The SVG standard, however, may lack native support for several user experience features, such as look and feel settings (e.g., themes) that affect multiple objects within a document.

Conventional methods discloses how an SVG object may be made theme-aware and still comply with the SVG standard so that it is portable between files and applications that apply the present disclosure and those that do not. By enabling the dynamic updating of SVG objects, the document-wide application of look and feel settings may be realized without deviating from the SVG standard. However, conventional methods may not mimic the whiteboard use case in video conference platform to draw any kind of drawings and share ideas similar to drawing on whiteboard in conference room.

There is therefore a need in the art to provide a methods and systems that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide methods and systems for efficiently, reliably and dynamically creating Scalable Vector Graphics (SVG) in video conferencing.

An object of the present disclosure is to provide methods and systems for dynamically creating a SVG created based on user's input in whiteboard application in video conferencing solution.

An object of the present disclosure is to provide methods and systems for passing information from one client device to other client device using web socket technology which can then create similar SVG.

An object of the present disclosure is to provide methods and systems for using web socket technology to collaborate between users in virtual video meeting. This helps in simulating the exact use case of whiteboard in conference room.

An object of the present disclosure is to enable user to draw and share ideas in video meeting to other participants.

An object of the present disclosure is to provide collaborative tool to share drawings of any idea or any system design. The user can draw free hand drawing or shapes like rectangle, circle, ellipse, square or line. User can also draw all these shapes or free hand drawing with any colour or thickness.

An object of the present disclosure is to help in online education, where teacher can use whiteboard to collaborate with students, healthcare platform, where doctor can use whiteboard to explain medical terms to patient, whiteboard can also be used to mimicked real world whiteboard which is very useful to explain concepts in conference rooms, and so on.

An object of the present disclosure is to enable user to download the whiteboard content as PDF or PNG, which then user can use later for any other purpose.

SUMMARY

Aspects of the present disclosure provide methods and systems for efficiently, reliably and dynamically creating Scalable Vector Graphics (SVG) in video conferencing.

The present disclosure provides methods and systems for dynamically creating a SVG based on user's input in whiteboard application in video conferencing solution.

An aspect of the present disclosure pertains to a system for dynamically creating scalable vector graphics in video conferencing. The system can include, one or more first computing devices that are associated with one or more users. The system can also include one or more second computing devices that are associated with one or more entities. The one or more first computing devices and the one or more second computing devices can be communicatively coupled by a communication network and a centralized server. A processor can be configured within the centralized server with the server being configured with a memory storing instructions which when executed enable the processor to receive a drawing data as input from the one or more users through the first computing devices of the one or more users and share the drawing data received onto one or more other computing devices associated with the one or more other users. The received input drawing data received on one of the one or more first computing devices can also be shared with the one or more second computing devices associated with the one or more entities.

Yet another aspect of the present disclosure pertains to a method for dynamically creating scalable vector graphics in video conferencing. The method can include establishing a communicative coupling between a centralized server and a pre-defined number of first computing devices of one or more of authorized users and a pre-defined number of second computing devices of one or more authorized entities. The method can include calling an Application Program Interface (API) to display a shared virtual whiteboard on the first computing devices associated with the one or more users and the second computing devices associated with one or more entities, based on an Identity (ID) detail of a conference. The virtual whiteboard can be visible to all the users that are communicatively coupled in the conference. Changes made to the whiteboard are reflected on the first computing devices and the second computing devices in real time. Further, in an embodiment, downloading can be done by the first computing device of a second user into a local storage of the first computing device of the second user the shared drawing input received by the first computing device of the second user visible on the shared virtual whiteboard.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present disclosure provides methods and systems for efficiently, reliably and dynamically creating Scalable Vector Graphics (SVG) in video conferencing. The present disclosure provides methods and systems for dynamically creating a SVG created based on user's input in whiteboard application in video conferencing solution. The present disclosure provides methods and systems for passing information from one client device to other client device using web socket technology which can then create similar SVG. The present disclosure provides methods and systems for using web socket technology to collaborate between users in virtual video meeting. This helps in simulating the exact use case of whiteboard in conference room. The present disclosure enables user to draw and share ideas in video meeting to other participants. The present disclosure provides collaborative tool to share drawings of any idea or any system design. The user can draw free hand drawing or shapes like rectangle, circle, ellipse, square or line. User can also draw all these shapes or free hand drawing with any colour or thickness. The present disclosure helps in online education, where teacher can use whiteboard to collaborate with students, healthcare platform, where doctor can use whiteboard to explain medical terms to patient, whiteboard can also be used to mimicked real world whiteboard which is very useful to explain concepts in conference rooms, and so on. The present disclosure enables user to download the whiteboard content as PDF or PNG, which then user can use later for any other purpose.

Figure 1:
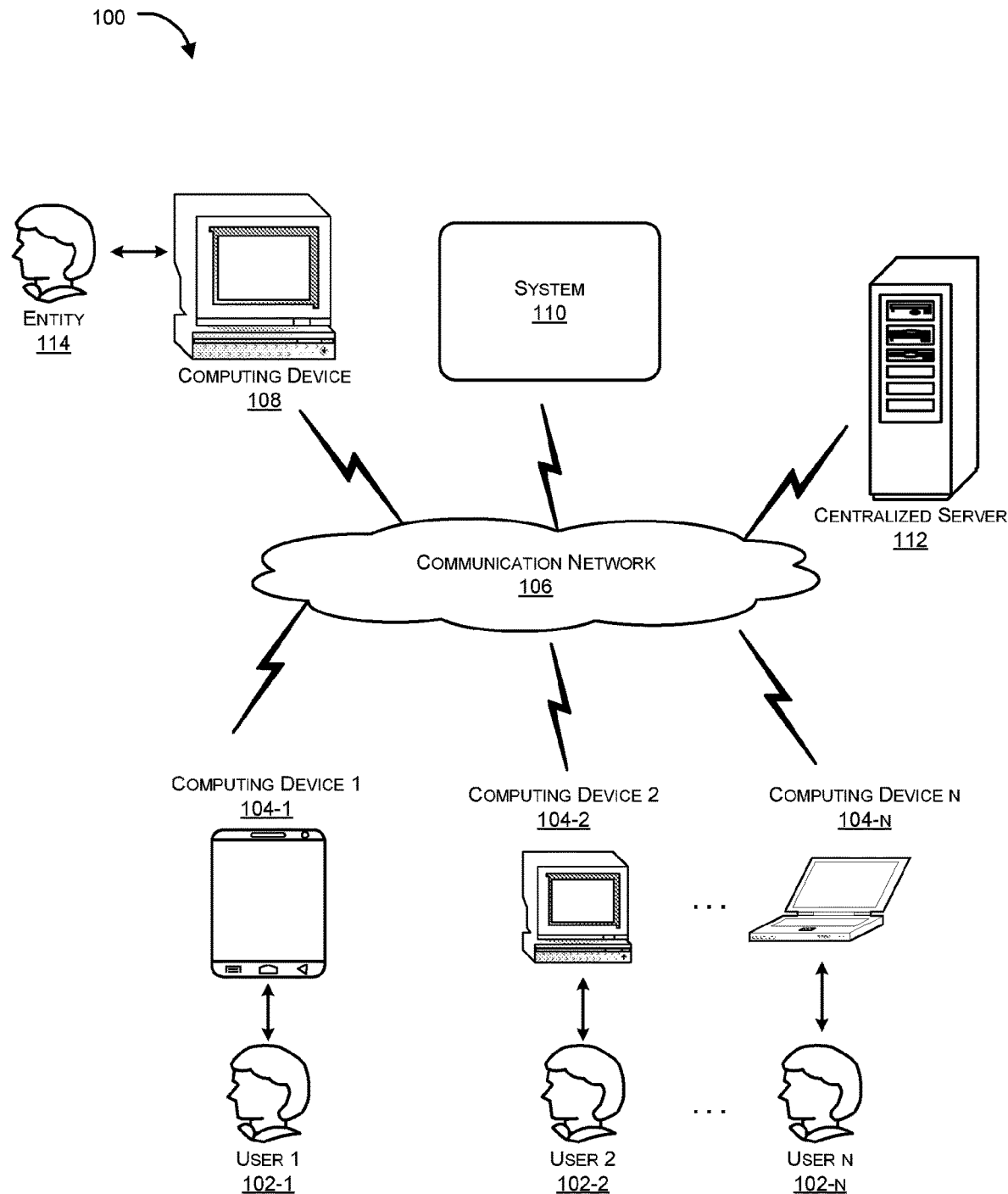
FIG. 1 illustrates an exemplary network architecture in which or with which proposed system of the present disclosure can be implemented, in accordance with an embodiment of the present disclosure.

Referring to FIG. 1 that illustrates an exemplary network architecture for a Scalable Vector Graphics (SVG) dynamic creation system (100) (also referred to as network architecture (100)) in which or with which a system (110) or simply referred to as the system (110) of the present disclosure can be implemented, in accordance with an embodiment of the present disclosure. As illustrated, the exemplary architecture (100) may be equipped with the system (110) for dynamically creating Scalable Vector Graphics (SVG) in video conferencing to users (102-1, 102-2, 102-3 . . . 102-N) (individually referred to as the user (102) and collectively referred to as the users (102)) associated with one or more first computing devices (104-1, 104-2 . . . 104-N) (individually referred to as the first computing device (104) and collectively referred to as the first computing devices (104)). The system (110) may be further operatively coupled to a second computing device (108) associated with an entity (114). The entity (114) may include a company, an organisation, an university, a lab facility, a business enterprise, a defence facility, or any other secured facility. In some implementations, the system (110) may also be associated with the second computing device (108). Further, the system (110) may also be communicatively coupled to the one or more first computing devices (104) via a communication network (106). In an embodiment, the first computing devices (104) and second computing devices (114) are interchangeable and may be owned by a user or an entity. IN an embodiment, the user and the entity are interchangeable.

The system (110) may be coupled to a centralized server (112). The centralized server (112) may also be operatively coupled to the one or more first computing devices (104) and the second computing devices (108) through the communication network (106). In some implementations, the system (110) may also be associated with the centralized server (112).

In an embodiment, the system (110) may use a Scalable Vector Graphics (SVG) as drawing canvas. In an embodiment, the system (110) may share drawing data using web socket to other users (102) of the first computing devices (104). The users (102) of first computing devices (104) may draw similar images. The system (110) may allow whiteboard as a collaborative tool between users (102) of first computing devices (104). The system (110) may allow users (102) to draw free hand drawing using pencil tool on the first computing devices (104). The system (110) may allow users (102) to draw any predefined shapes like rectangle, square, circle, ellipse or straight line on the first computing devices (104). In an embodiment, the user (102) may choose any or multiple colours for drawing on the first computing devices (104) and user may also write text in any colour or font size. Further, the user (102) of the first computing devices (104) may download SVG content as Portable Document Format (PDF) or Portable Network Graphics (PNG). The SVG content may be fetched on to the current sharing whiteboard on the first computing devices (104), based on Identity (ID) details of conference.

Further, a centralized server (112) or system (110) may store authorization information per user (102) of the first computing devices (104). When the first computing devices (104) call the Application Program Interface (API) of whiteboard, the centralized server (112) may first check whether the requested user is connected to the virtual conference room or not. If user is not connected then the centralized server (112) may notify client with the error response.

If the user (102) of the first computing devices (104) is authorized, then the centralized server (112) may fetch the necessary information such as host information, room information. If the user (102) of the first computing devices (104) requests for the first time, then centralized server (112) may create a new whiteboard and store the data in cache i.e. the database.

If the user (102) of the first computing devices (104) has already shared the whiteboard, then centralized server (112) may fetch the whiteboard data and returns the whiteboard to the first computing devices (104). Along with the whiteboard information, centralized server (112) may provide unique JSON Web Token (JWT) token that binds with user information and room information. It is pertinent only to that virtual conference room.

In an embodiment, the system (110) may be a System OnChip (SoC) system but not limited to the like. In another embodiment, an onsite data capture, storage, matching, processing, decision-making and actuation logic may be coded using Micro-Services Architecture (MSA) but not limited to it. A plurality of microservices may be containerized and may be event based in order to support portability.

In an embodiment, the network architecture (100) may be modular and flexible to accommodate any kind of changes in the system (110) as proximate processing may be acquired towards re-estimating of stock. The system (110) configuration details can be modified on the fly.

In an embodiment, the system (110) may be remotely monitored and the data, application and physical security of the system (110) may be fully ensured. In an embodiment, the data may get collected meticulously and deposited in a cloud-based data lake to be processed to extract actionable insights. Therefore, the aspect of predictive maintenance can be accomplished.

In an exemplary embodiment, the communication network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more first computing devices (104), the one or more second computing devices (108) may communicate with the system (110) via set of executable instructions residing on any operating system, including but not limited to, Android™, iOS™, Kai OS™, and the like. In an embodiment, to one or more first computing devices (104), and the one or more second computing devices (108) may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (104), and the one or more second computing devices (108) may not be restricted to the mentioned devices and various other devices may be used. A smart computing device may be one of the appropriate systems for storing data and other private/sensitive information.

Figure 2:
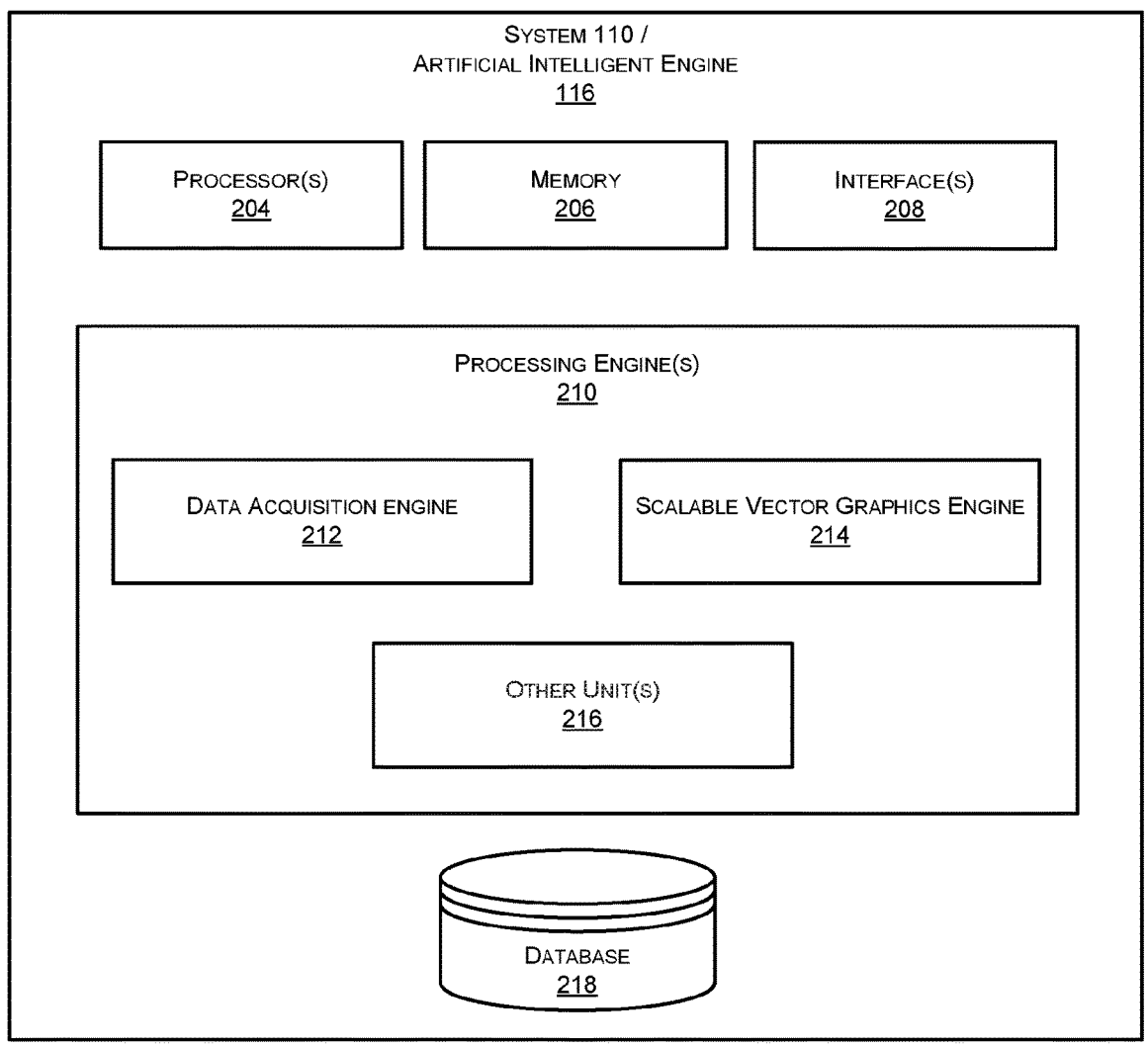
FIG. 2 illustrates an exemplary representation of proposed system for dynamically creating Scalable Vector Graphics (SVG) in video conferencing, in accordance with an embodiment of the present disclosure.

FIG. 2 with reference to FIG. 1, illustrates an exemplary representation of system (110) for dynamically creating Scalable Vector Graphics (SVG) in video conferencing, in accordance with an embodiment of the present disclosure. In an aspect, the system (110) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) 206. The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110) or the centralized server (112). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110)/centralized server (112) may comprise the machine-readable storage medium storing the instructions and the processing resource to execute the instructions, or the machine-readable storage medium may be separate but accessible to the system (110)/centralized server (112) and the processing resource. In other examples, the processing engine(s) (208) may be implemented by electronic circuitry.

The processing engine (208) may include one or more engines selected from any of a data acquisition engine (212), Scalable Vector Graphics (SVG) engine (214), and other engines (216). The processing engine (208) may further edge based micro service event processing but not limited to the like.

Figure 3A:
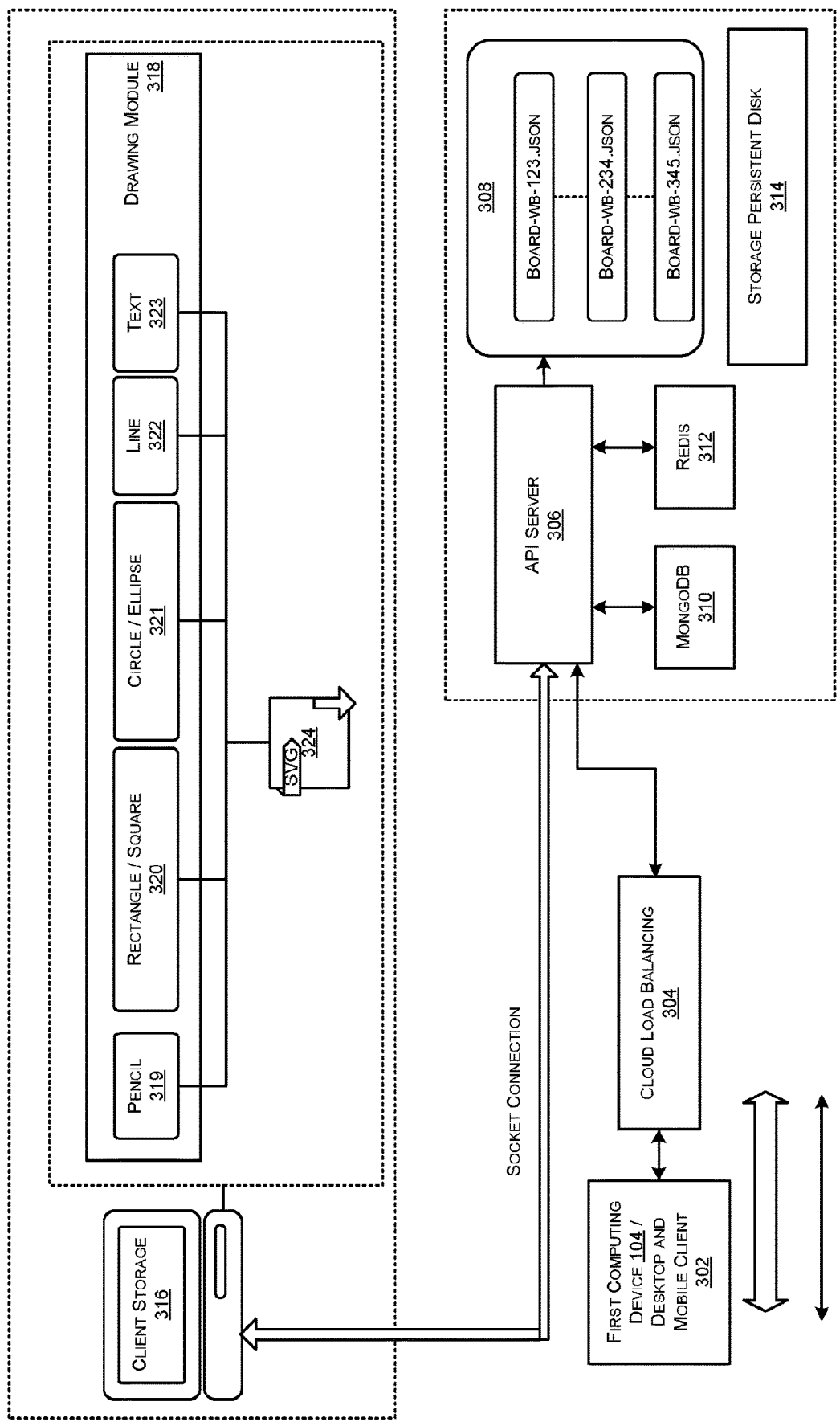
FIG. 3A illustrates exemplary block diagram representation of a proposed system architecture, in accordance with an embodiment of the present disclosure.

FIG. 3A illustrates exemplary block diagram representation of a proposed system architecture (300), in accordance with an embodiment of the present disclosure.

As illustrated in FIG. 3A, when an end user (102) taps on the share whiteboard option on the first computing devices (104)/desktop and mobile client (302), may call the Application Program Interface (API) and in turn establish a socket connection with API server (306) such as the centralized server (112).

The API server (306) such as the centralized server (112) may perform necessary checks (described below in the sequence diagrams) such as user's room connection status, user's identity with respective to the room, and so on. The first computing devices (104)/desktop and mobile client (302) may be communicatively connected via a cloud load balancing (304). Further, the system architecture (300) may include drawing modules (318), which may include a pencil module (319), a rectangle/square module (320), a circle/ellipse module (321), a line module (322), and a text module (323). The output from the drawing modules (318) may be the SVG (324).

If the user (102) requests via the first computing devices (104)/desktop and mobile client (302), for the first time, then the API server (306) may create a new whiteboard and store the data in cache i.e., Redis (312) and mongo database (310). If the user via the first computing devices (104)/desktop and mobile client (302), may have already shared the whiteboard, then the API server (306) may fetch the whiteboard data and returns the whiteboard to the desktop and mobile client (302). Further, there may be a continuous polling action between the API server (306) and the first computing devices (104)/desktop and mobile client (302). The polling may ensure the data transmission from the API server (306) to the first computing devices (104)/desktop and mobile client (302).

Further, the desktop and mobile client (302) may be continuously sending the data to API server (306) through socket messages. The API server (306) may store the socket messages in the form of "json" (308) and save the json to a file in a persistent disk storage (314). Then the API server (306) may send back the same data to the desktop and mobile client (302) which may be displayed to the end user via the first computing devices (104)/desktop and mobile client (302).

Figure 3B:
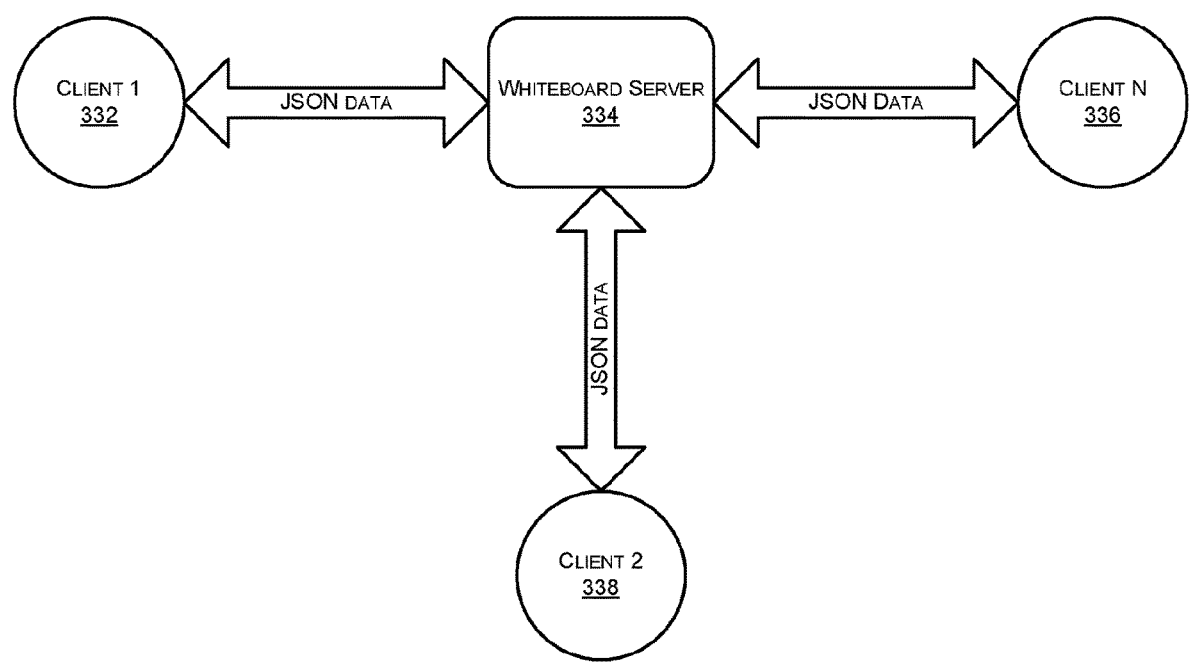
FIG. 3B illustrates an exemplary block diagram representation of broadcasting of Scalable Vector Graphics (SVG) data drawn on whiteboard, in accordance with an embodiment of the present disclosure.

As illustrated in FIG. 3B, there may be any number of Java Script (JS) client such as the desktop and mobile client (302), which can draw the SVG (324) and send the json data to whiteboard server (334) such as the API server (306)/centralized server (112) using WebSocket. This whiteboard server (334) may then broadcast the json data to other clients such as the desktop and mobile client (302) which can draw similar images on own SVG whiteboard of other clients such as the desktop and mobile client (302).

Figure 4A:
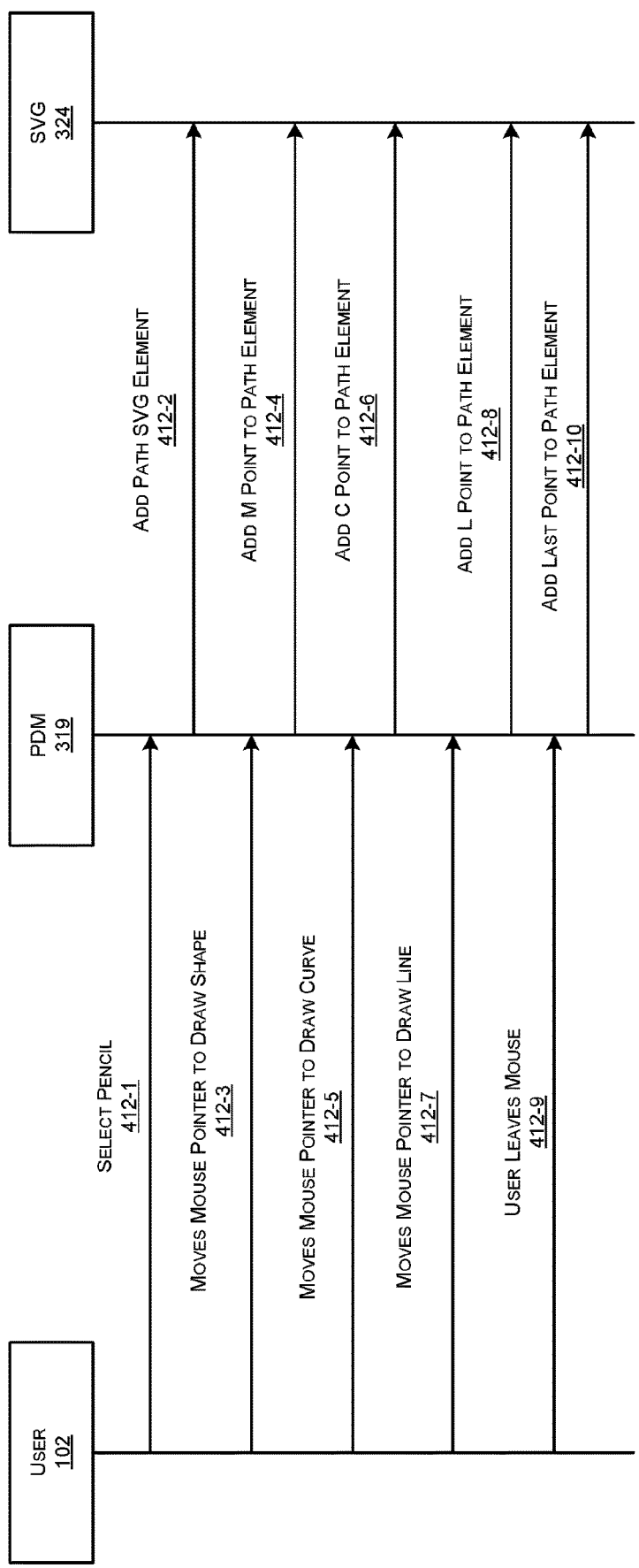
FIG. 4A illustrates an sequence diagram representation of interaction between user, Pencil Drawing Module (PDM), and Scalable Vector Graphics (SVG), in accordance with an embodiment of the present disclosure.

FIG. 4A illustrates an sequence diagram representation of interaction between user (102), Pencil Drawing Module (PDM) (319), and Scalable Vector Graphics (SVG) (324), in accordance with an embodiment of the present disclosure.

At step (412-1), the user (102) may select pencil via the PDM module (319). At step (412-2) the PDM module (319) may add path SVG element on the SVG (324). At step (412-3), the user (102) may move mouse pointer to draw shape via the PDM module (319). At step (412-4), the PDM module (319) may add M point to path element on the SVG (324). For example, M may be move to, this attribute added to SVG path element when user moves mouse cursor from one point to other. At step (412-5), the user (102) may move mouse pointer to draw curve via the PDM module (319). At step (412-6) the PDM module (319) may add C point to path element on the SVG (324). For example, C may be curve to, this attribute added to SVG path element when user draws a curve.

At step (412-7), the user (102) may move mouse pointer to draw line via the PDM module (319). At step (412-8) the PDM module (319) may add L point to path element on the SVG (324). For example, L may be line to, this attribute added to SVG path element when user draws line. At step (412-9), the user (102) may leave mouse. At step (412-10) the PDM module (319) may add last point to path element on the SVG (324).

For instance, whenever user (102) starts drawing using pencil then the pencil module (319) may add path element in SVG (324). Based on cursor movement the pencil module (319) may add following attributes to the SVG path element on SVG (324).

For example, <path id="lkkl7pol9g" stroke="#000000" stroke-width="4" opacity="1" style="fill: none; stroke-line cap: round; stroke-line join: round;" d="M 253 95 L 253 95 C 253 95 254.05205792062952 96 95.53147871433418 254 C 253.36455209659613 101.71903113063486 252.4378544690805 107.4283139323131 251 113 C 249.7617653969262 117.79815908691096 247.38160384143362 122.2411423239509 246 127 C 244.37692975945026 132.59057527300462 242.82327260234857 138.23709178356006 242 144 C 241.1501634144012 149.94885609919157 241.2070925043492 155.99431737387386 241 162 C 240.87363832192082 165.6644886642965 241 169.33333333333334 241 173 C 241 174.33333333333334 241 175.66666666666666 241 177 C 241 177.33333333333334 241 178 241 178"></path>

Code Explanation:
Move To (M) defines from where to start the line.
Line To (L) defines where line will go from Move To
Curvet (C) defines curves while we are drawing.
The CSS fill property defines the fill colour of the line
The CSS stroke-width property defines the width of the border of the line
The CSS stroke property defines the colour of the border of the line Following message may be sent to websocket server which then broadcasted to other clients (302).
["broadcast",{"board":"1", "data":{"type":"line", "id": "lkkl7zfe98","color":"#000000", "size":4,"opacity":1, "tool":"Pencil"}}]
["broadcast",{"board":"1", "data":{"type":"child", "parent":"lkkl7zfe98", "x":202, "y":116, "tool":"Pencil"}}]

Type line in above message represents start of the line and child type element defines other points of the line.

Figure 4B:
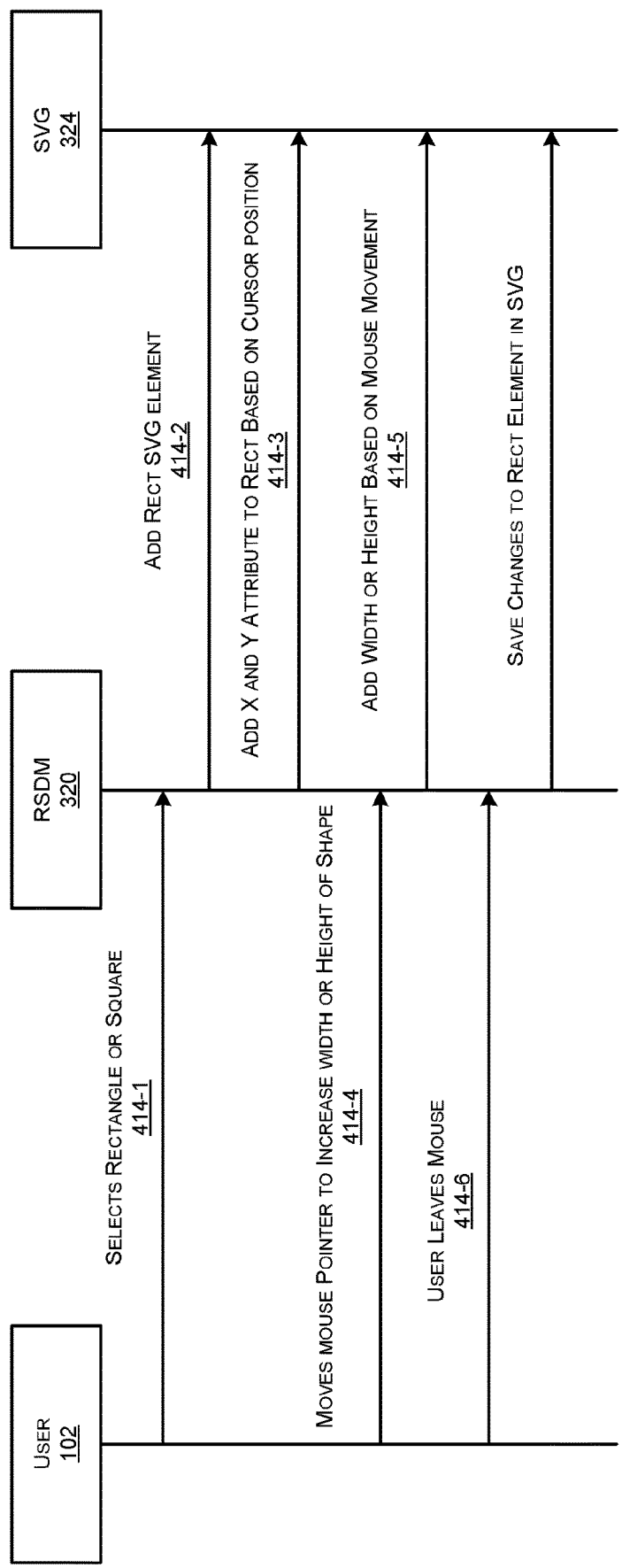
FIG. 4B illustrates an sequence diagram representation of interaction between user, Rectangle/Square Drawing Module (RSDM), and Scalable Vector Graphics (SVG), in accordance with an embodiment of the present disclosure.

FIG. 4B illustrates an sequence diagram representation of interaction between user (102), Rectangle/Square Drawing Module (RSDM) (320), and Scalable Vector Graphics (SVG) (324), in accordance with an embodiment of the present disclosure.

At step (414-1), the user (102) may select rectangle or square via the RSDM module (320). At step (414-2) the RSDM module (320) may add RECT SVG element on the SVG (324). At step (414-3), the RSDM module (320) may add x and y attribute to RECT to the SVG (324), based on cursor position. At step (414-4), the user (102) may move mouse pointer to increase width or height of shape. At step (414-5), the RSDM module (320) may add width or height based on mouse movement. At step (414-6) the user (102) may leave mouse. At step (414-7), the RSDM module (320) may save changes to RECT element in SVG (324).

For example, whenever user (102) starts drawing using rectangle or square the RSDM module (320) may add RECT element in SVG (324). Based on cursor movement the RSDM module (320) may add width, height, x, y attribute to this RECT element.

If it is square then the RSDM module (320) may make sure that width and height should always be same. For example:
<rect id="rkkl83mhgm" stroke="#000000" stroke-width="4" opacity="1" style="fill: none;" width="98" height="94" x="565" y="182"></rect>

Code Explanation:
The width and height attributes of the <rect> element define the height and the width of the rectangle.
The style attribute is used to define CSS properties for the rectangle.
The CSS fill property defines the fill colour of the rectangle.
The CSS stroke-width property defines the width of the border of the rectangle.
The CSS stroke property defines the colour of the border of the rectangle.

Following message from the RSDM module (320) may be sent to websocket server which then broadcasted to other clients (302).
["broadcast",{"board":"1", "data":{"type":"rect", "id": "rkkl83mhgm", "color":"#000000", "'size":4, "opacity":1, "x":565, "y":182, "x2":565, "y2":182, "tool": "Rectangle"}]

Figure 4C:
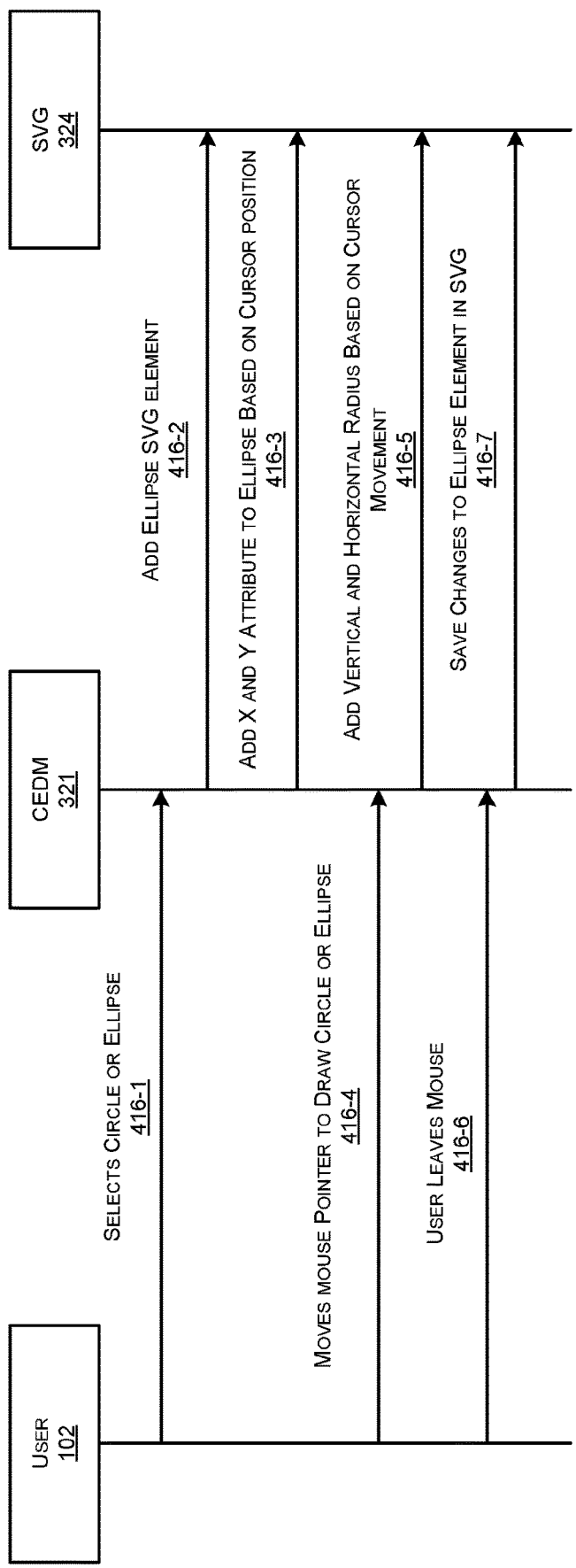
FIG. 4C illustrates an sequence diagram representation of interaction between user, Circular/Ellipse Drawing Module (CEDM), and Scalable Vector Graphics (SVG), in accordance with an embodiment of the present disclosure.

FIG. 4C illustrates an sequence diagram representation of interaction between user (102), Circular/Ellipse Drawing Module (CEDM) (321), and Scalable Vector Graphics (SVG) (324), in accordance with an embodiment of the present disclosure.

At step (416-1), the user (102) may select circle or ellipse via the CEDM module (321). At step (416-2) the CEDM module (321) may add ellipse SVG element on the SVG (324). At step (416-3), the CEDM module (321) may add x and y attribute to ellipse to the SVG (324), based on cursor position. At step (416-4), the user (102) may move mouse pointer to draw circle or ellipse. At step (416-5), the CEDM module (321) may add vertical and horizontal radius based on cursor movement. At step (416-6) the user (102) may leave mouse. At step (416-7), the CEDM module (321) may save changes to ellipse element in SVG (324).

For example, whenever user (102) starts drawing using circle or ellipse CEDM module (321) may add ellipse element in SVG (324). Based on cursor movement CEDM module (321) may add cx, cy, rx and ry attribute to this ellipse element.

For example:
<ellipse id="ekkl8eg0s2" stroke="#90468b" stroke-width="4" opacity="1" cy="219" rx="119.5" ry="119.5" cx="429"></ellipse>

Code Explanation:

The cx attribute defines the x coordinate of the center of the ellipse.

The cy attribute defines the y coordinate of the center of the ellipse.

The rx attribute defines the horizontal radius.

The ry attribute defines the vertical radius.

The CSS stroke-width property defines the width of the border of the ellipse.

The CSS stroke property defines the color of the border of the ellipse.

The CSS opacity property defines opacity of the ellipse.

Following message the CEDM module (321) may send to websocket server which then broadcasted to other clients (302)

["broadcast",{"board":"1","data":{"type":"ellipse","id": "ekk8clpaz","color":"#000000","size": 4,"opacity":1, "x":883,"y":170,"x2":883,"y2":170,"tool":"Ellipse"}}]

Figure 4D:
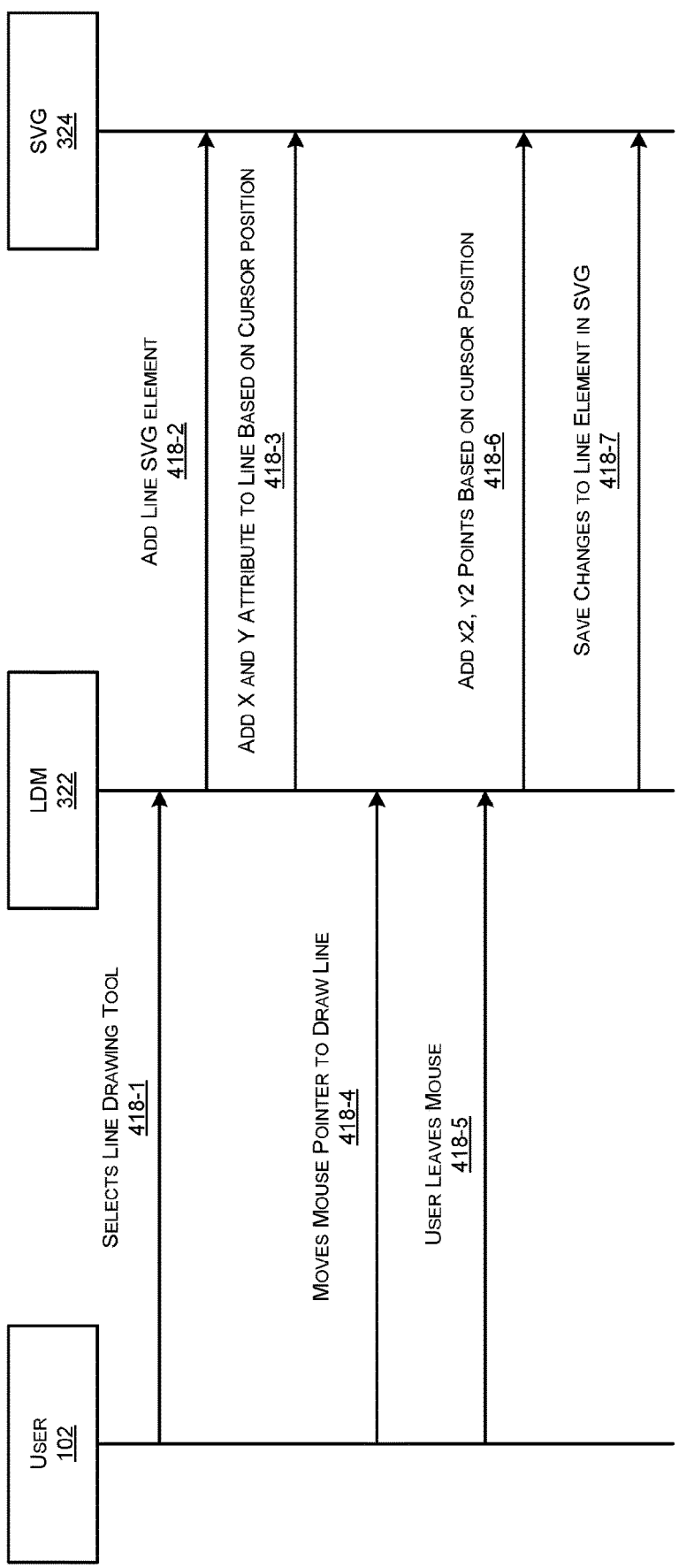
FIG. 4D illustrates an sequence diagram representation of interaction between user, Line Drawing Module (LDM), and Scalable Vector Graphics (SVG), in accordance with an embodiment of the present disclosure.

FIG. 4D illustrates an sequence diagram representation of interaction between user (102), Line Drawing Module (LDM) (322), and Scalable Vector Graphics (SVG) (324), in accordance with an embodiment of the present disclosure.

At step (418-1), the user (102) may select line drawing tool via the LDM module (322). At step (418-2) the LDM module (322) may add line SVG element on the SVG (324). At step (418-3), the LDM module (322) may add x and y attribute to line to the SVG (324), based on cursor position. At step (418-4), the user (102) may move mouse pointer to draw line. At step (418-5) the user (102) may leave mouse. At step (418-6), the LDM module (322) may add X2, Y2 pints based to the SVG (324), based on cursor position. At step (418-7), the LDM module (322) may save changes to line element in the SVG (324).

For example, when user (102) may start drawing the LDM module (322) add line element in the SVG (324). The LDM module (322) may then adds x1, y1 attributes to this line element based on cursor position when user (102) starts drawing. Whenever user (102) leaves the mouse that point may be consider as end of the line so LDM module (322) may then adds x2, y2 based on this position to line element in the SVG (324).

For example:
<line id="skkl8902ya" stroke="#000000" stroke-width="4" opacity="1" y2="299" y1="236" x1="260" x2="461"></line>

Code Explanation:
The x1 attribute defines the start of the line on the x-axis.
The y1 attribute defines the start of the line on the y-axis.
The x2 attribute defines the end of the line on the x-axis.
The y2 attribute defines the end of the line on the y-axis.
The CSS stroke-width property defines the width of the border of the line
The CSS stroke property defines the colour of the border of the line.
The CSS opacity property defines opacity of the line.

Following message the LDM module (322) may send to websocket server which then broadcasted to other clients (302).

["broadcast",{"board":"1", "data":{"type":"straight", "id":"skkl8902ya", "color":"#000000", "size":4, "opacity":1, "x":260, "y":236, "tool":"Straight line"}}]

Figure 4E:
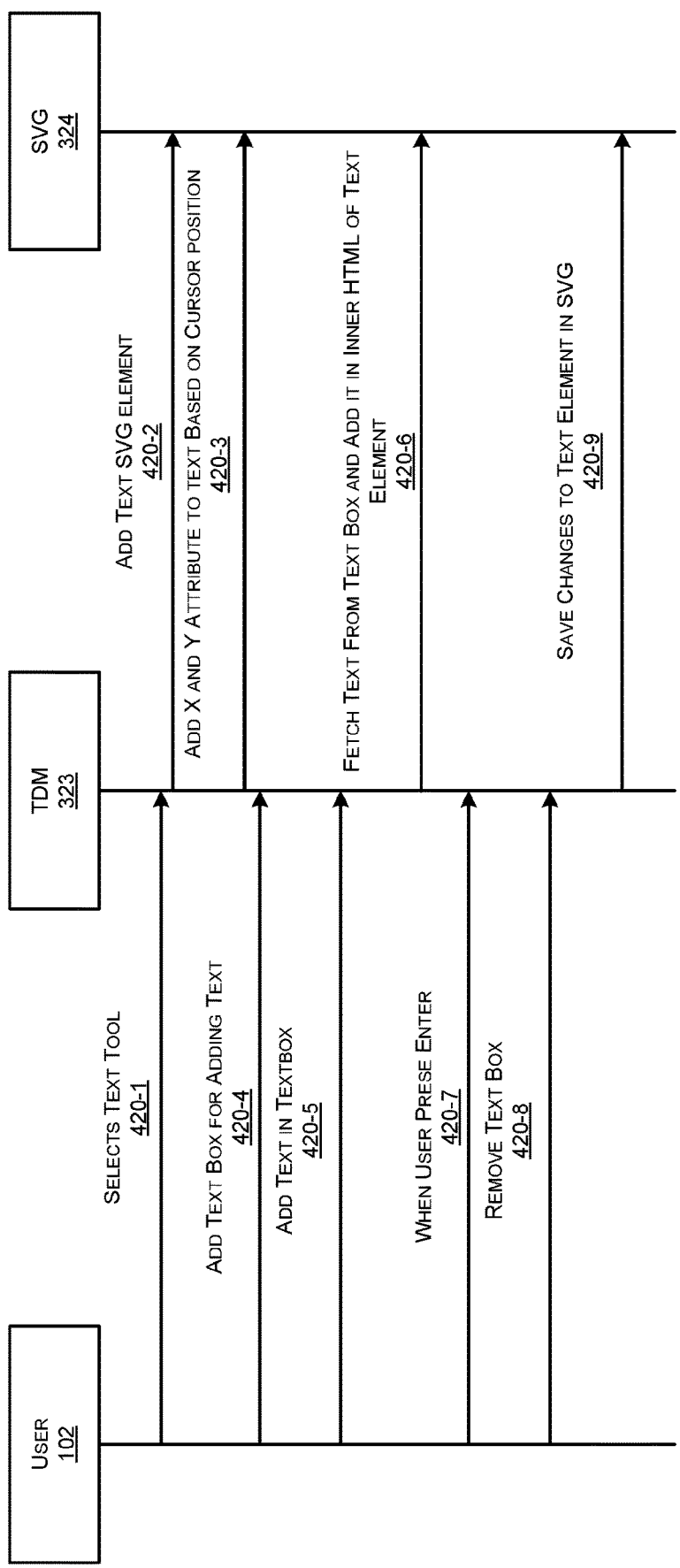
FIG. 4E illustrates an sequence diagram representation of interaction between user, Text Drawing Module (TDM), and Scalable Vector Graphics (SVG), in accordance with an embodiment of the present disclosure.

FIG. 4E illustrates an sequence diagram representation of interaction between user (102), Text Drawing Module (TDM) (323), and Scalable Vector Graphics (SVG) (324), in accordance with an embodiment of the present disclosure.

At step (420-1), the user (102) may select text tool via the TDM module (323). At step (420-2) the TDM module (323) may add text SVG element on the SVG (324). At step (420-3), the TDM module (323) may add x and y attribute to text to the SVG (324), based on cursor position. At step (420-4), the user (102) may add text box for adding text. At step (420-5) the user (102) may add text in the box. At step (420-6), the TDM module (323) may fetch text from text box and add the fetched text in inner Hyper Text Mark-up Language (HTML) of text element. At step (420-7), when user (102) presses enter on the client device (302), at step (420-8), when user removes the text box, at step (420-9), the TDM module (323) may save changes to text element in the SVG (324).

For example, when user (102) selects text tool then the TDM module (323) may add text element in SVG (324) and add x,y attribute of text based on cursor position, also the TDM module (323) may add text box for user to add text. Whatever text user (102) is adding in text box the TDM module (323) may add that text in inner HTML of text element in the SVG (324). When user (102) press enter then the TDM module (323) may remove the textbox and save the text element in the SVG (324).

For example:
<text id="tkkl8h04ax" x="174" y="179" font-size="36" fill="#000000" opacity="1">aaaa</text>

Code Explanation:
The x attribute defines x co-ordinate of top left point of text.
The y attribute defines y co-ordinate of top left point of text.
The CSS attribute font-size defines font size of the text.
The CSS attribute fill defines colour of the text.
The CSS attribute opacity defines the opacity of the text.

Following message the TDM module (323) may send to websocket server which then broadcasted to other clients (302).

["broadcast",{"board":"1", "data":{"type":"new", "id": "tkkl8h04ax", "color":"#000000", "size":36, "opacity":1, "x":174, "y":179, "isBold":false, "isUnderline":false, "isItalic":false, "tool":"Text"}}]

["broadcast",{"board":"1", "data":{"type":"update", "id":"tkkl8h04ax", "txt":"a", "isBold":false, "isUnderline":false, "isItalic":false, "size": 36, "color": "#000000", "tool":"Text"}}]

Eraser Functionality:
To mimic eraser functionality based on cursor position the system architecture (300) may identify which element is there and then we delete that element from SVG (302).

Undo/Redo Functionality:
The system architecture (300) may cache what user (102) is drawing and then use the cache data to perform undo and redo functionality. The system architecture (300) may use similar drawing/delete methodology to draw or delete based on user's action (undo or redo).

Download Functionality:
Every client (302) may have ability to download pictorial representation of SVG element in the PDF or PNG format.

To download the system architecture (300) may use third party tool save SVG AsPNG. This tool converts SVG element as data URI which we then convert to image which user can then download as PNG or PDF.

Figure 5:
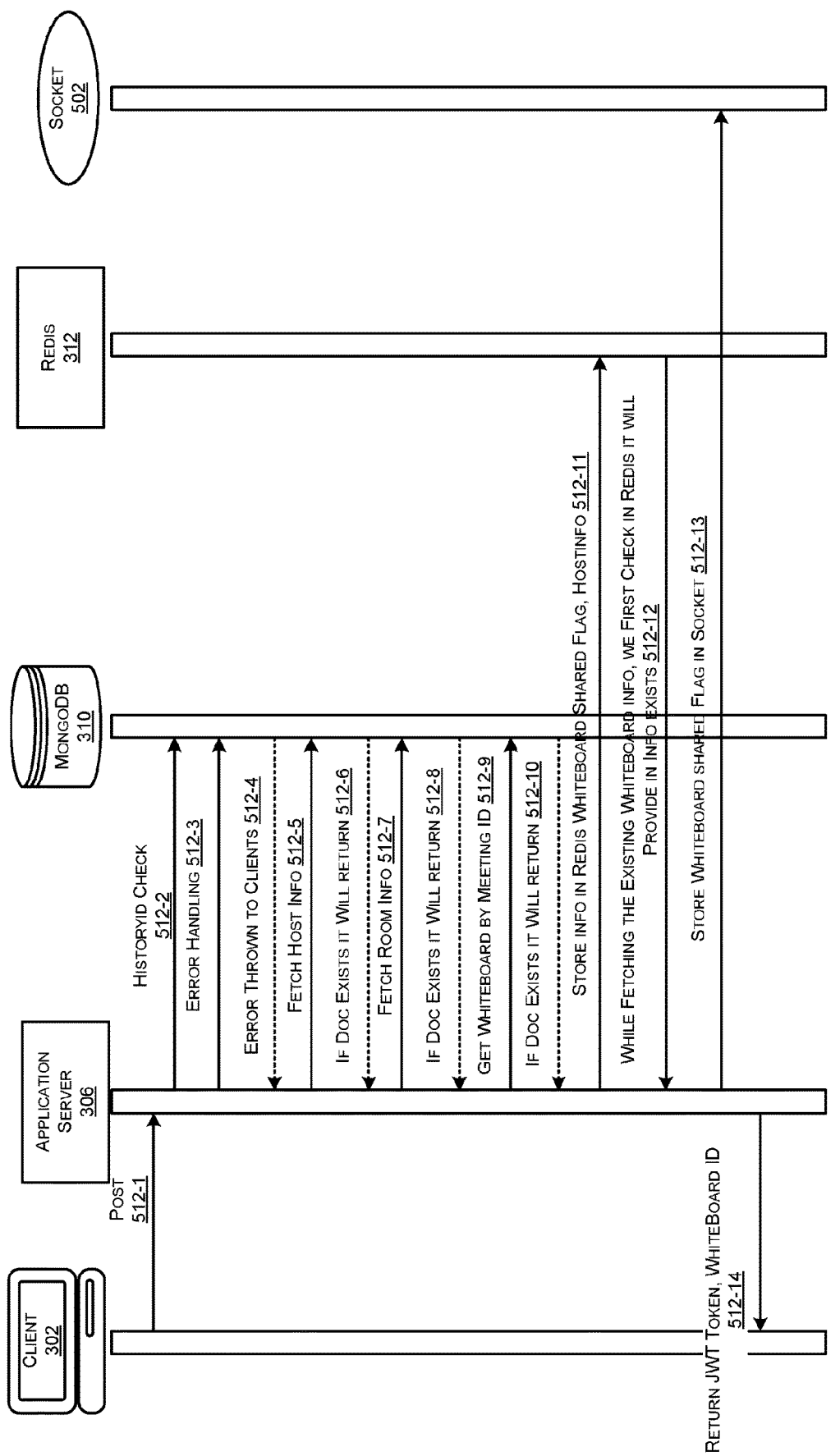
FIG. 5 illustrates an exemplary sequence diagram representation for sharing a new whiteboard, in accordance with an embodiment of the present disclosure.

FIG. 5 illustrates an exemplary sequence diagram representation for sharing a new whiteboard, in accordance with an embodiment of the present disclosure.

The sequence diagram explains to fetch the current sharing whiteboard by meeting ID requested by clients (302). At step (512-1), the client (302) may post meeting ID/whiteboard/start-sharing. At step (512-2), the API server (306) may check history of meeting ID. At step (512-3), the API server (306) may send error handling to the Mongo DB (310). At step (512-4), the Mongo DB (310) may throw error to clients (302). At step (512-5), the API server (306) may fetch host information from the Mongo DB (310). At step (512-6), the id doc exists, then the Mongo DB (310) may return to the API server (306). For example, the API server (306) may maintain authorization information per user. When clients (302) call the API, the API server (306) may first check whether the requested user is connected to the room or not. If user is not connected then server (306) may notify client (302) with the error response.

At step (512-7), the server (306) may fetch room information from the Mongo DB (310). For example, if the user is authorized, then the server (306) may fetch the necessary information such as host information, room information. At step (512-8), if the document exists then the Mongo DB (310) may return the document to the server (306). At step (512-9), the server (306) may get whiteboard information by meeting ID from the mongo DB (310). At step (512-10), if the document exists then the Mongo DB (310) may return the document to the server (306). At step (512-11), the server (306) may store information in Redis whiteboard shared flag, host information on the Redis (312). For example, if user requests for the first time, then server (306) creates a new whiteboard and store the data in cache i.e., Redis and mongo database (310). At step (512-12), while fetching the existing whiteboard information, the server (306) may first check in Redis (312), the Redis (312) may provide in information to the server (306), if the information exists with the Redis (312). At step (512-13), the server (306) may store whiteboard shared flag in socket (502). At step (512-14), the server (306) may return JWT token, whiteboard ID to client (302). For example, if the user (102) has already shared the whiteboard, then server (306) fetches the whiteboard data and returns it to client. Along with the whiteboard information, server (306) gives unique JWT token that binds with user information and room information. It is pertinent only to that room.

Figure 6:
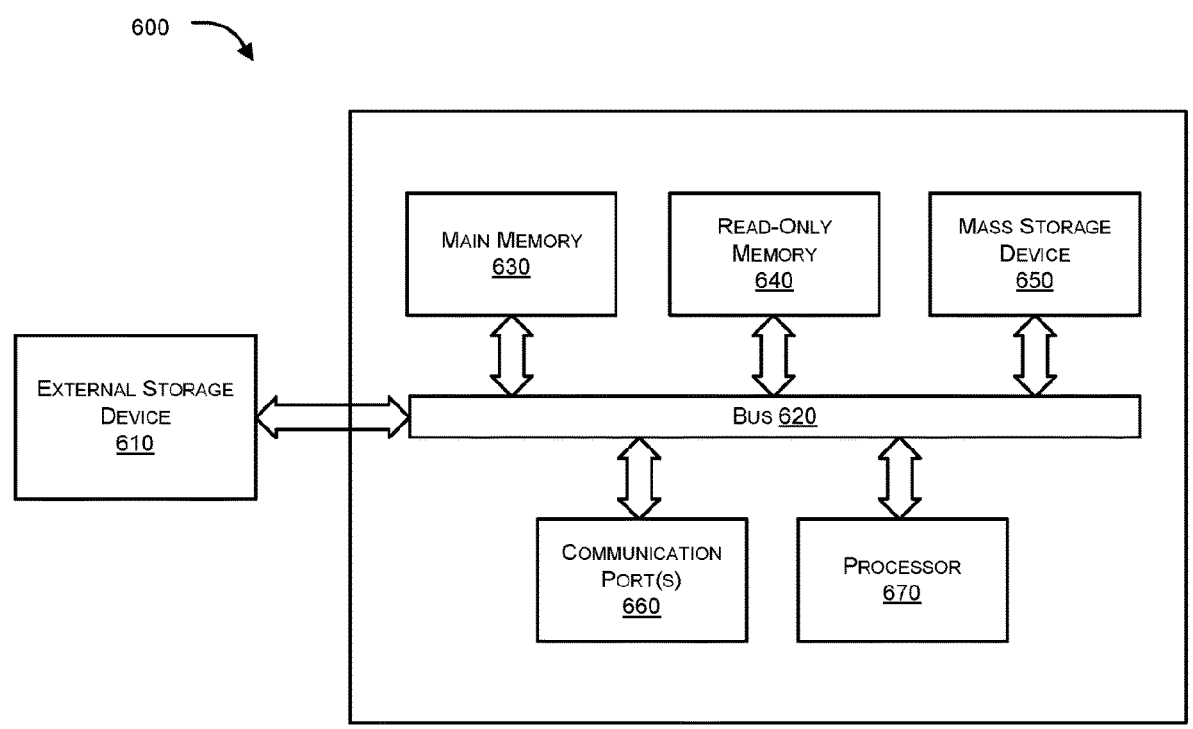
FIG. 6 illustrates an exemplary computer system in which or with which embodiments of the present invention can be utilized, in accordance with embodiments of the present disclosure.

FIG. 6 illustrates an exemplary computer system (600) in which or with which embodiments of the present invention can be utilized in accordance with embodiments of the present disclosure. As shown in FIG. 6, computer system 600 can include an external storage device 610, a bus 620, a main memory 630, a read only memory 640, a mass storage device 650, communication port 660, and a processor 670. A person skilled in the art will appreciate that the computer system may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (670) may include various modules associated with embodiments of the present invention. Communication port (660) can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects. Memory (630) can be Random Access Memory (RAM), or any other dynamic storage device commonly known in the art. Read-only memory 640 can be any static storage device(s) e.g., but not limited to, a Programmable Read Only Memory (PROM) chips for storing static information e.g., start-up or BIOS instructions for processor (670). Mass storage (650) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks (e.g., SATA arrays), available from various vendors.

Bus (620) communicatively couples processor(s) (670) with the other memory, storage and communication blocks. Bus (620) can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus (620) to support direct operator interaction with a computer system. Other operator and administrative interfaces can be provided through network connections connected through communication port 660. The external storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides methods and systems for efficiently, reliably and dynamically creating Scalable Vector Graphics (SVG) in video conferencing.

The present disclosure provides methods and systems for dynamically creating a SVG created based on user's input in whiteboard application in video conferencing solution.

The present disclosure provides methods and systems for passing information from one client device to other client device using web socket technology which can then create similar SVG.

The present disclosure provides methods and systems for using web socket technology to collaborate between users in virtual video meeting. This helps in simulating the exact use case of whiteboard in conference room.

The present disclosure enables user to draw and share ideas in video meeting to other participants.

The present disclosure provides collaborative tool to share drawings of any idea or any system design. The user can draw free hand drawing or shapes like rectangle, circle, ellipse, square or line. User can also draw all these shapes or free hand drawing with any colour or thickness.

The present disclosure helps in online education, where teacher can use whiteboard to collaborate with students, healthcare platform, where doctor can use whiteboard to explain medical terms to patient, whiteboard can also be used to mimicked real world whiteboard which is very useful to explain concepts in conference rooms, and so on.

The present disclosure enables user to download the whiteboard content as PDF or PNG, which then user can use later for any other purpose.

We claim:

1. A system for dynamically creating scalable vector graphics (SVG) in video conferencing, the system comprising:
   a centralized server communicatively coupled with one or more first computing devices, the centralized server comprising a processor configured with a memory storing instructions which when executed enable the processor to:
   authorize the one or more first computing devices to access a conference hosted over a network based on an identity detail of the conference, wherein the authorization is performed by mapping the identity detail of the conference with a conference joining metadata received from the one or more first computing devices;
   receive drawing metadata as an input from one or more users through the one or more first computing devices;
   dynamically create, in real time, SVG metadata of the received drawing metadata; and
   share, in real time, the created SVG metadata with one or more other computing devices.

2. The system as claimed in claim 1, wherein the one or more first computing devices being associated with the one or more users.

3. The system as claimed in claim 1, wherein the one or more users include any or a combination of a company, an organisation, a university, a lab facility, a business enterprise, and a defence facility.

4. The system as claimed in claim 3, wherein the processor being further configured to:
   receive, by the first computing device of a second user a first set of data packets pertaining to a download instruction; and
   download, by the first computing device of the second user into a local storage of the first computing device of the second user, the SVG metadata created by the processor.

5. The system as claimed in claim 4, wherein the downloaded drawing metadata being a file, said file being a Portable Document Format (PDF) or Portable Network Graphics (PNG) file stored on the local storage of the first computing device of the second user.

6. The system as claimed in claim 5, wherein the conference includes establishing a communicative coupling between the centralized server and a pre-defined number of first computing devices of one or more of authorized users and a pre-defined number of second computing devices of one or more authorized entities, said communicative coupling being established on authorization of the pre-defined number of first computing devices.

7. The system as claimed in claim 1, wherein the drawing metadata is input by a user from an interface on the first computing device of the user, and received by the processor on a Scalable Vector Graphics (SVG) canvas.

8. The system as claimed in claim 1, wherein the drawing metadata received at the centralized server being in a pre-defined shape of one or more of a rectangle, a square, a circle, an ellipse or a straight line from an Application Program Interface (API) of any of the one or more first computing devices.

9. The system as claimed in claim 1, wherein the one or more users (102-N) select one or a combination of colours as the drawing metadata to be transmitted to the server by the one or more first computing devices.

10. The system as claimed in claim 1, wherein the identity detail (ID) of the conference being auto-generated by the centralized server (112) to enable a communicative coupling between the first user computing devices.

11. A method for dynamically creating scalable vector graphics SVG) in video conferencing comprising:
   establishing a communicative coupling between a centralized server and a pre-defined number of first computing devices;
   authorizing the first computing devices to access a conference hosted over a network based on an identity detail of the conference, wherein the authorization is performed by mapping the identity detail of the conference with a conference joining metadata received from the first computing devices;
   receiving a drawing metadata as input from the first computing devices;
   creating, a dynamic SVG metadata based on the received drawing metadata; and
   transmitting the created SVG metadata to one or more other computing devices associated with the one or more other users.

12. The method as claimed in claim 11, further comprising:
   downloading, on receipt of a download instruction, by the first computing device of a second user into a local storage of the first computing device of the second user the shared drawing input received by the first computing device of the second user visible on the shared virtual whiteboard.

13. The method as claimed in claim 11, wherein the pre-defined number of first computing devices being specified within a conference metadata generated by the processor.

14. The method as claimed in claim 11, further comprising, retrieving an Application Program Interface (API) to display a shared virtual whiteboard on the first computing devices associated with the one or more users.

* * * * *